United States Patent [19]

Valstyn

[11] Patent Number: 4,841,625
[45] Date of Patent: Jun. 27, 1989

[54] AUTOMATIC THROAT HEIGHT CONTROL FOR FILM HEAD

[75] Inventor: Erich P. Valstyn, Santa Barbara, Calif.

[73] Assignees: Computer and Communications Technology Corporation, San Diego, Calif.; Magnetic Peripherals, Inc., Minneapolis, Minn.

[21] Appl. No.: 592,346

[22] Filed: May 3, 1984

Related U.S. Application Data

[62] Division of Ser. No. 375,714, May 7, 1982, Pat. No. 4,511,942.

[51] Int. Cl.$^4$ .............................................. G11B 5/42
[52] U.S. Cl. ...................................... 29/603; 29/593; 51/165 R
[58] Field of Search ............... 29/603, 593; 51/165 R; 360/122, 125–127

[56] References Cited

U.S. PATENT DOCUMENTS 4,155,106  5/1979  Muraoka et al. ................. 29/603 X
4,477,968  10/1984  Kracke et al. ........................ 29/603

OTHER PUBLICATIONS

IBM Technical Disclosure Bulletin, vol. 18, No. 1, Jun. 1975, p. 227, "Throat Height Control".
IBM Technical Disclosure Bulletin, vol. 23, No. 6, Nov. 1980, p. 2550, "Lapping Guides for Magnetic Heads".

Primary Examiner—Carl E. Hall
Attorney, Agent, or Firm—Cushman, Darby & Cushman

[57] ABSTRACT

A lapping guide is provided to determine the position at which lapping of a thin film head to define pole faces should be terminated. Accurate positioning of the lapping guide with respect to the head is insured by forming various elements of the lapping guide during the same photolithographic process steps as those used to form elements of the head. The lapping guide may be used either as an electrical or optical guide. When used as an optical guide, a second lapping guide may be provided as an indicator that more frequency inspection is necessary.

7 Claims, 1 Drawing Sheet

U.S. Patent    Jun. 27, 1989    4,841,625
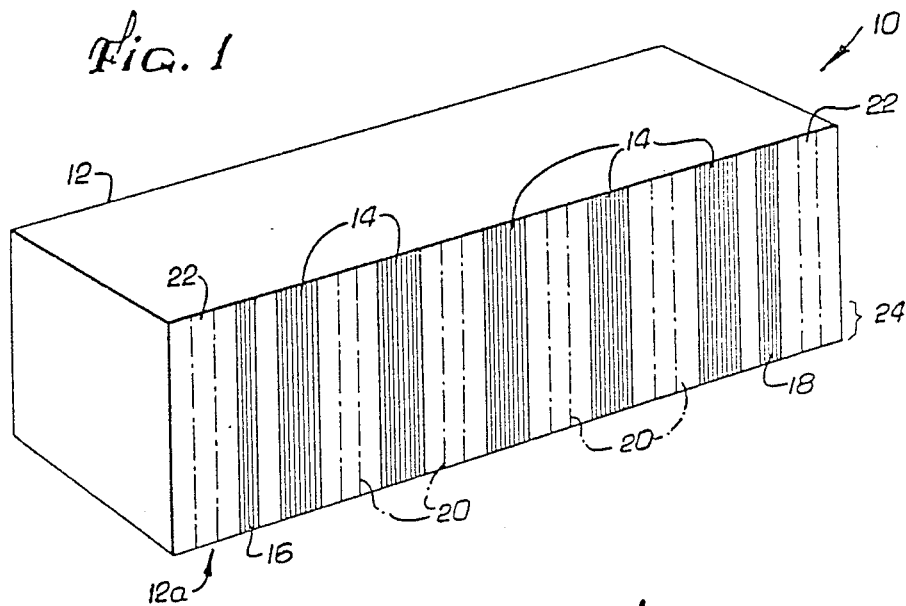
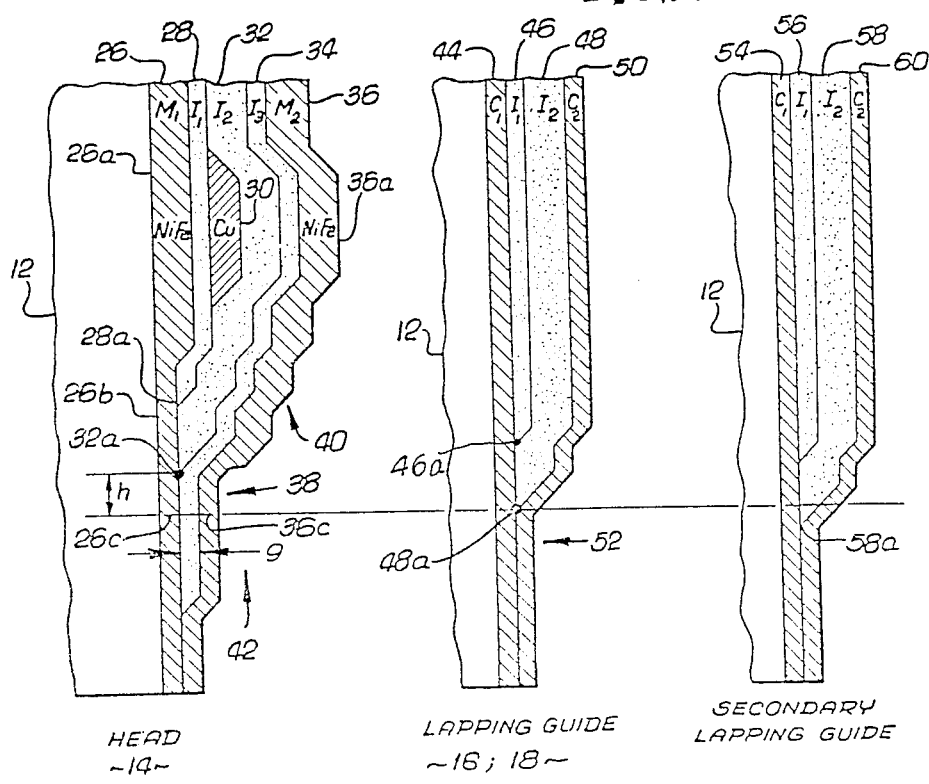

AUTOMATIC THROAT HEIGHT CONTROL FOR FILM HEAD

This is a division of application Ser. No. 375,714, filed on May 7, 1982, now U.S. Pat. No. 4,511,942.

BACKGROUND OF THE INVENTION

1. Field of the Invention

This invention relates to magnetic heads and more particularly to magnetic heads having a film structure.

Film heads are often fabricated utilizing photolithographic techniques to successively deposit a number of films over a substrate. These films include a pair of magnetic films separated by a plurality of insulating films. One or more turns of conductive material are deposited within the insulating films and operate as the sense winding of the head.

After the deposition process has been completed, the bottom of the substrate is milled, or lapped, to remove a portion of the magnetic material so as to define pole faces. One of the insulating layers extends between the magnetic layers to the pole faces. One or more additional insulating layers serve to separate the magnetic layers from the conductive turns within the body of the heads. One of these insulating layers has an edge which is located a predetermined distance from the pole faces. At this edge, the separation distance between the magnetic layers begins to increase over its value at the pole faces. The distance from the pole faces to the point at which the spacing between the magnetic films begins to become greater than the gap length is termed the "throat height". Typically, the gap length may be on the order of twenty microinches and the throat height on the order of forty microinches. The latter height is not critical as long as it is greater than zero (i.e., the lapping does not continue to the point where the magnetic layers begin to diverge) and is less than some predetermined maximum length (typically 50 microinches).

2. Description of the Prior Art

Automatic throat height control has been achieved in the past by the provision of a lapping guide (or sensor) which causes termination of the lapping process at the right time. However, because of the very small dimensions of the throat height, the positioning of the lapping guide becomes critical if correct throat height is to be achieved. Prior art lapping guides have not always been able to achieve the desired accuracy of positioning with respect to the insulating layers which define the point from which the throat height is measured.

Various lapping guides for film type magnetic heads are disclosed in U.S. Pat. Nos. 3,821,815 to Abbott et al., 3,787,638 to Murai and 4,155,106 to Muraoka et al. Despite the benefits provided by such sensors, they are not entirely satisfactory for the purpose of controlling throat height.

SUMMARY OF THE INVENTION

It is an object of the present invention to provide a lapping guide or sensor which may be used to accurately control the throat height in a magnetic film head. It is another object of the present invention to provide a lapping guide which takes into account the uncertainty inherent in the photolithographic processes used to form the various films.

These and other objects are achieved by providing a lapping guide near a head element. The guide is formed of a pair of sensor films which are in contact over a portion of their length and are separated over the remainder of their length by one or more insulating films. The point at which the sensor films separate, i.e., the edge of the insulating film, is offset from the point at which the magnetic films of the head element diverge. This offset is equal to the desired throat height. In order to accurately control the offset, the insulating films which determine its position are formed during the same photolithographic process steps as the insulating films of the head which define the point where the magnetic films diverge. The head is lapped to define pole faces and lapping is stopped when the connection between the sensor films is broken. The lapping guide can be used as an electrical sensor by connecting the sensor films to an electric circuit. Alternatively, the lapping guide may be used as an optical sensor by periodically inspecting the lapped surface to determine when contact between the sensor films is broken.

BRIEF DESCRIPTION OF THE DRAWINGS

The invention will now be described with reference to the accompanying drawings, wherein:

FIG. 1 is a diagrammatic perspective view of a head module incorporating a number of head elements and two or more lapping guides.

FIG. 2 is a sectional view of the tip of the head of FIG. 1, showing the positional relation between a head element and first and second lapping guides.

DESCRIPTION OF THE PREFERRED EMBODIMENT

The following description is of the best presently contemplated mode of carrying out the invention. This description is made for the purpose of illustrating the general principles of the invention and should not be taken in a limiting sense. The scope of the invention is best determined by reference to the appended claims.

Referring to FIG. 1, a multiturn film head module 10 includes a substrate 12, which may for example be a semiconductor wafer, upon which are formed a plurality of individual head elements 14. These head elements are formed by successively depositing a number of films on the substrate using photolithographic techniques.

After the films have been deposited on the substrate 12, the bottom 12a of the substrate is lapped to define pole faces for each of the head elements. Determination of the point at which lapping is stopped is accomplished by means of a pair of lapping guides 16 and 18 located on either side of the head element array. Alternatively, more precise determination of the lapping point for each head element may be facilitated by providing a lapping guide 20 adjacent each head element. Secondary lapping guides 22 may also be provided to aid in the lapping process. Although the module 10 is shown as having five head elements, any number of head elements could be provided. Typical modules include between ten and twenty head elements.

The head module 10 includes a tip portion 24, the cross-section of which is shown in detail in FIG. 2. Cross-sections are shown for a head element 14, the lapping guide 16 and the lapping guide 22. The head 14 includes a first layer of magnetic material 26 which is deposited on the surface of the substrate 12. This layer includes a portion 26a having a first thickness and a portion 26b having a second thickness. This can be accomplished either by double deposition (deposition of two films) or by deposition of a single relatively thick film and subsequent ion milling. The dual thickness for the magnetic layer is desirable in order to provide a small dimension for the pole face at the bottom of the head and a relatively large dimension, and thereby a more efficient magnetic structure, for the remainder of the head. A typical material for the magnetic layer 26 is a nickel iron alloy.

After formation of the layer 26, a first insulating layer 28 is deposited over a portion of the layer 26. Various materials may be used to form this layer. In the present embodiment of the invention, a hard baked photoresist material is utilized. Other suitable materials include $SiO_2$ and $Al_2O_3$. Photomasking techniques are used to define an edge 28a of the insulating layer.

After the first insulating layer has been deposited, conductive copper turns 30 are formed over the insulating layer. Only the lowermost turn is shown in FIG. 2. Typically, the head will include eight total turns. The insulating layer 28 serves to isolate the turns 30 from the magnetic layer 26. The position and number of turns is also determined by photomask techniques.

The next step in the formation of the head is the deposition of a second insulating layer 32, which in the present embodiment is also photoresist. This layer is relatively thick and extends over the edge 28a of the first insulating layer and contacts the magnetic layer 26. A photomask is used to define an edge 32a of the second insulating layer. The layer 32 is used to provide a relatively thick spacer between the two magnetic layers of the head.

After the second insulating layer has been formed, a third insulating layer 34 is deposited. In the present embodiment, this layer is formed of silicon dioxide ($SiO_2$). The layer 34 extends beyond the edge 32a of the second insulating layer and adjacent to the first magnetic layer 26. The purpose of the third insulating layer is to define the gap length g between the first magnetic layer 26 and a second magnetic layer 36. The magnetic layer 36 is deposited over the third insulating layer 34 and includes a relatively thick upper portion 36a and thin lower portion 36b. The thin portion 36b is separated from the thin portion 26b of the first magnetic layer solely by the third insulating layer 34. Thus, the head 14 includes a tip portion 38 comprised of the first and second magnetic layers separated by the third insulating layer, and a body portion 40 which includes the first and second insulating layers and conductive turns in addition to the magnetic layers and third insulating layer.

After the various layers have been deposited, the lower surface of the head is lapped in a direction corresponding to an arrow 42 in order to define pole faces 26c and 36c. Ideally, the lapping is continued until the pole faces are a distance h from the point 32a, i.e., the point where the magnetic layers 26 and 36 begin to diverge. The distance h is commonly referred to as the throat height of the head. This distance is typically less than 50 microinches. The throat height may be less, as long as the lapping does not continue past the point 32a. If lapping is continued past the point 32a, the distance between the magnetic layers at the pole faces will be greater than the distance g and the head will not function properly.

In order to determine when lapping should be terminated, the lapping guides 16 and 18 are provided. These guides are comprised of a first conductive layer 44 deposited on the substrate 12, a first insulating layer 46, a second insulating layer 48 and a second conductive layer 50. The conductive layers 44 and 50 are in contact with each other in an area 52 near the bottom of the substrate and are separated along the remainder of their length by the insulating layers 46 and 48. The conductors may be connected to an appropriate circuit at the top of the substrate in order to provide an electrical lapping termination indicator. The insulating layer 48 is formed so that its edge 48a is offset below the edge 32a of the insulating layer 32 of the head element by the throat height h. During lapping, contact between the conductors 44 and 50 will be broken when the lapping reaches the point 48a. When the conductors are connected to an appropriate circuit, the breaking of contact will cause a signal to be generated indicating that the lapping should be terminated.

Because of the extremely small dimensions for the throat height, the position of the lapping guide with respect to the head element (i.e., the offset distance between the edges 32a and 48a) is critical. A major difficulty arises in that the photolithographic processes which are used to establish the positions of the edges 28a and 32a of the insulating layers of the head have uncertainties associated with them which may result in the edges being established some distance above or below the exact design position. Although the photomasks used to define the edges 28a and 32a can be accurately made, variations in the exposure and removal of photoresist used to define the edges can result in the mispositioning of the edges with respect to their design location. In order to achieve the proper throat height, the level of the pole faces must be moved up or down by the same distance as the error in formation of the edge 32a. That is, the lapping process must be terminated later or sooner by the appropriate amount of time. The present invention achieves this objective by ensuring that the lapping guide is precisely positioned with respect to the edge 32a (i.e., the point 48a is offset from the point 32a by the distance h).

The exact position of the point 32a is a function of the processes used to define both the first insulating layer 28 and the second insulating layer 32. For example, if the edge 28a is established somewhat above its exact design position, this will to a certain extent affect the position at which the edge 32a is formed. In addition, even if the edge 28a is accurately defined, process variations in the formation of the layer 32 may result in mispositioning of the edge 32a. Thus, inaccuracy in the formation of the edge 32a may be a result of process variations in the formation of either or both of the insulating layers 28 and 32.

In order to insure that the lapping guide is accurately positioned with respect to the edge 32a, the insulating layers 46 and 48 are formed during the same photolithographic steps as the insulating layers 28 and 32, respectively. The position of the edge 46a of the first insulating layer of the lapping guide with respect to the edge 28a of the first insulating layer of the head can be accurately defined on a mask. Any process variations which affect the position of the edge 28a will similarly affect the position of the edge 46a, and the desired offset between the edges will therefore remain substantially unchanged. Similarly, the insulating layers 32 of the head and 48 of the lapping guide are formed during the same processing steps, and the desired offset between the edges 32a and 48a will thus be maintained. By forming the layers which define the position of the lapping guide at the same time as the formation of the layers which define the position of the head, the lapping guide will be accurately positioned despite any process variations.

The conductor layers 44 and 50 may be identical with the magnetic layers 26 and 36 of the head, so that the fabrication of the lapping guide does not involve any process steps which are not already used to fabricate the head. Such is not an absolute requirement, however, since the formation of the conductors 44 and 50 does not affect the position of the edge 48a.

The lapping guide 16 may also be used as an optical lapping guide. In such an instance, the lapped surface is periodically inspected during the lapping process. As long as the layers 44 and 50 appear in intimate contact, the lapping process is continued. As soon as the smallest spacing between the two layers becomes visible, the lapping process is stopped. It should be noted that in such an instance, the layers 44 and 50 need not necessarily be made of conductive material. In order to provide an indication that the end point of the lapping process is near and that the lapped surface must therefore be inspected at shorter intervals, the secondary lapping guide 22 may be provided. The guide 22 is comprised of conductor layers 54 and 60 and insulating layers 56 and 58 and is identical to the lapping guide 16 with the exception that the edge 58a is positioned a short distance below the edge 48a.

In summary, the present invention provides a lapping guide whose position is established during the same photolithographic process steps as is the position of the head element. Process variations which affect the position of the head element thus equally affect the position of the lapping guide, and the desired offset between the lapping guide and the head element is maintained. Contact between the conductor layers of the lapping guide will therefore be interrupted exactly at the point in time when the lapping process must be terminated to establish the desired throat height. With appropriate circuitry, this interruption of electrical contact can be used to automatically stop the lapping process. Alternatively, the lapping guide may be used as an optical guide. In such a case, a secondary lapping guide may be provided as an indicator that more frequent inspection of the lapped surface is necessary. The provision of the lapping guide does not require any additional processing steps over those used to form the head. When used in a multihead module, a pair of lapping guides are typically provided. Alternatively, a lapping guide may be provided for each head element in order to insure precise throat height.

I claim:

1. A method of making a thin film magnetic head comprising the steps of:
    forming a head by depositing a plurality of films on a substrate, said films including a pair of magnetic films defining pole pieces, a first insulating film separating said pole pieces to define a head gap, at least one conductive turn located between said pole pieces and at least one additional insulating film separating said pole pieces from said at least one turn wherein said head includes a tip portion which is comprised of said magnetic films separately solely by said first insulating film and extends from an edge of said at least one additional insulating film;
    forming a lapping guide by depositing a plurality of films on said substrate, said films including a pair of sensor films separated along a portion of their length by at least one additional film and having a connection therebetween, wherein said additional film is deposited during the same said depositing step as deposits said additional insulating film of said head and offset form the edges of said additional insulating film a predetermined distance; and
    lapping said tip portion and lapping guide until the connection between said sensor films is broken to thereby form pole faces which are spaced from the edge of said additional insulating film by said predetermined distance.

2. A method according to claim 1 wherein said step of forming said head includes the steps of:
    depositing a first magnetic film on said substrate;
    depositing a first additional insulating film over said first magnetic film, said first additional insulating film having an edge facing said tip portion;
    depositing at least one conductive turn over said first additional insulating film;
    depositing a second additional insulating film over said at least one turn, said first additional insulating film and said first magnetic film, said second additional insulating film having an edge facing said tip portion and extending beyond the edge of said first additional insulating film;
    depositing said first insulating film over said second additional insulating film and said first magnetic film; and
    depositing a second magnetic film over said first insulating film.

3. A method according to claim 2 wherein said step of forming said lapping guide includes the steps of:
    depositing a first sensor film on said substrate;
    depositing a first additional film over said first sensor film simultaneously with the deposition of said first additional insulating film of said head; and
    depositing a second additional film over said first additional film simultaneously with the deposition of said second additional insulating film of said head.

4. A method according to claim 1 or 3 wherein said magnetic films and sensor films are of the same material and are formed during the same processing steps.

5. A method of making a magnetic head, comprising the steps of:
    depositing a first layer of magnetic material on a substrate to form a first pole piece;
    depositing a first layer of conductive material on said substrate to form a first lapping guide conductor;
    depositing, during a single processing step, a first layer of insulating material over a portion of both said first pole piece and first lapping guide conductor, wherein said insulating material covering said lapping guide conductor extends a predetermined distance beyond a line defined by an edge of said insulating material covering said pole piece;
    depositing one or more turns of conductive material over said first layer of insulating material;
    depositing, during a single processing step, a second layer of insulating material over said first layer of insulating material, said conductive terns, and a portion of both said first pole piece and said first lapping guide conductor, wherein said insulating material covering said lapping guide conductor extends a predetermined distance beyond a line defined by an edge of said insulating material covering said pole piece;
    depositing a third layer of insulating material over the portion of said second layer of insulating material overlying said first pole piece and over a portion of said pole piece not covered by said second insulating layer;

depositing a second layer of magnetic material over said third insulating layer to form a second pole piece;

depositing a second layer of conductive material over said second insulating layer and said first conducting layer to form a second lapping guide conductor; and lapping the edge of said substrate to form pole faces, wherein the lapping is continued until contact between said first and second lapping guide conductors is broken.

6. In a method comprising the steps of depositing with a mask a feature formed of insulating material on a first surface of a machinable prism, machining a first edge of the first surface from an initial location toward a sensing line, and finally monitoring the output of a continuity tester, wherein said sensing line has a preselected spacing from the feature, said first edge is substantially parallel to the sensing line, and said feature is adjacent a conductive area on the first surface intersected by a sensing line, the improvement comprising the steps of:

(a) during the feature-depositing step, depositing a layer of the insulating material on the conductive area in a barrier area thereon lying along the sensing line and extending away from the initial location of the first edge;

(b) depositing a layer of conductive material within the boundaries of the barrier area on the insulating material and extending into and contacting the conductive area electrically only between the sensing line and the initial location of the first edge; and (c) attaching the continuity tester between the conductive layer within the barrier area and the conductive area.

7. A method of making a magnetic head comprising the steps of:

providing a substrate;

forming a head by depositing a plurality of layers of material on the substrate, said layers including a pair of layers of material defining pole pieces, a first layer of insulating material separating the pole pieces to define a head gap and an additional layer of insulating material between the pole piece layers, wherein the head includes a tip portion which is comprised of said pole piece layers separated solely by said first insulating layer and extends from an edge of said additional insulating layer;

forming a lapping guide by depositing a plurality of layers of material on the substrate, said layers including a pair of connected sensor layers separated along a portion of their length by an additional insulating layer, wherein said additional insulating layer of the lapping guide is deposited at the same time as said additional insulating layer of the head and has an edge offset from the edge of said additional insulating layer of the head by a predetermined distance toward a lapping edge of the substrate; and lapping said edge of the substrate including the tip portion and lapping guide until the connection between the sensor layers is broken thereby to form pole faces which are spaced from the edge of said additional insulating layer of the head by the predetermined distance.

* * * * *

UNITED STATES PATENT AND TRADEMARK OFFICE
CERTIFICATE OF CORRECTION

PATENT NO. : 4,841,625
DATED : June 27, 1989
INVENTOR(S) : VALSTYN, Erich P.

It is certified that error appears in the above-identified patent and that said Letters Patent is hereby corrected as shown below:

ON THE FIRST, COVER PAGE:

Reads: "[73] Assignee: Computer and Communications Technology Corporation, San Diego, Calif.; Magnetic Peripherals, Inc., Minneapolis, Minn.

Should Read: --[73] Assignee: Magnetic Peripherals Inc., Minneapolis, Minn.

Signed and Sealed this

Tenth Day of July, 1990

Attest:

HARRY F. MANBECK, JR.

Attesting Officer

Commissioner of Patents and Trademarks